Patented Jan. 24, 1950

2,495,284

UNITED STATES PATENT OFFICE 2,495,284

POLYCYANOHYDRIN MADE BY REACTING HYDROGEN CYANIDE WITH A MONOOLE-FIN/CARBON MONOXIDE POLYMER

Paul S. Pinkney, Wilmington, Del., assignor to E. I. du Pont de Nemours & Company, Wilmington, Del., a corporation of Delaware No Drawing. Application August 3, 1948, Serial No. 42,349

12 Claims. (Cl. 260—63)

This invention relates to new compositions of matter, and more particularly to new polymeric materials and to their preparation.

This invention has as its object a new and useful composition of matter. A further object is a new and useful type of polymer comprising a polycyanohydrin. Still further objects reside in methods for preparing these polycyanohydrins.

Simple molecules containing but a single cyanohydrin group have long been known in the art, and their preparation from aldehydes and ketones has been carefully investigated. For example, the cyanohydrin of acetone has been prepared by the reaction between acetone and anhydrous hydrogen cyanide as reported by Urech, Ann. 164, 255 (1872) and Ultée, Ber. 39, 1857 (1906). Further, some simple molecules containing two cyanohydrin groups have also been prepared by similar methods. For example, monomeric products such as the dicyanohydrin of diacetyl is reported by Fittig, Daimler and Keller, Ann. 249, 208 (1888), and the dicyanohydrin of acetylacetone is reported by Zelinsky, Ber. 24, 4007 (1891) and Fittig, Ann. 353, 13 (1907). However, there has been no mention heretofore of a true polymeric polycyanohydrin of the kind described herein having a chain composed of a plurality of recurring units and in addition containing a plurality of cyanohydrin groups, i. e., a molecule consisting of a plurality of recurring structural units containing the cyanohydrin group.

The polycyanohydrins described herein are obtained by reacting hydrogen cyanide with a polyketone, i. e., a mono-olefin/carbon monoxide polymer which contains recurring carbonyl groups, the carbonyl carbon being an atom in the chain of contiguous atoms comprising the polymer chain. In the present polycyanohydrins, the carbonyl carbon of the initial polyketone has attached pairwise thereto —CN and —OH groups as lateral substituents.

The reaction is carried out in basic medium, namely, one providing a pH above 7. Although a catalyst may or may not be used, it is preferable to include a small amount of basic catalyst in the reaction zone to accelerate the reaction. Various inorganic and organic bases can be used for this purpose, but the alkali and alkaline earth metal cyanides and, to a somewhat lesser extent, pyridine, are particularly advantageous because of the high conversions obtained.

In a suitable method for preparing the present polycyanohydrins, the monoolefin/carbon monoxide polymer is dissolved in liquid hydrogen cyanide in a suitable reaction vessel, the alkali or alkaline earth metal cyanide or pyridine catalyst is added, the reaction is allowed to continue at a suitable temperature until the desired degree of completion is obtained, and the product is isolated. These polycyanohydrins can be prepared by batch, semi-continuous or continuous processes.

The invention is further illustrated by the following examples in which all quantities are given in parts by weight unless otherwise designated.

Example I

To a solution of 52 parts of dioxane and 14 parts of an ethylene/carbon monoxide polymer, containing ethylene and carbon monoxide in a molar ratio of 3.6:1 and having a molecular weight of 447, in a closed reactor, fitted with a reflux condenser and means for efficient agitation of the contents, is added 6 parts of liquid hydrogen cyanide and a solution of 0.1 part of potassium cyanide in one part of water. The resulting mixture is stirred at 24° C. for three and one-half hours. At the end of this time, the dioxane and excess hydrogen cyanide are removed by distillation. The residue is taken up in chloroform and washed with water. The chloroform solution is separated, dried with anhydrous sodium sulfate, filtered, and the chloroform removed by distillation. There is thus obtained 13 parts of a polycyanohydrin as a light brown oil analyzing for 76.54% carbon, 11.34% hydrogen, 0.40% nitrogen, and a molecular weight of 681. The nitrogen content corresponds to a conversion of 4% of the carbonyl groups of the parent polyketone to cyanohydrin groups.

Example II

A reactor fitted for operation under high pressure is charged with 104 parts of dioxane, 0.5 part of potassium cyanide, and 43 parts of an ethylene/carbon monoxide polymer, containing ethylene and carbon monoxide in a molar ratio of 3.6:1 and having a molecular weight of 447. The reactor is then closed, cooled in a solid carbon dioxide-methanol bath, evacuated, and 70 parts of liquid hydrogen cyanide is added. The reactor is sealed, placed in a shaker machine and heated until an internal temperature of 75° C. is reached. The reactor is maintained at this temperature under autogenous pressure with agitation for fifteen hours. It is then cooled to room temperature, opened, the excess hydrogen cyanide is bled to the atmosphere, and the remaining liquid residue is removed. The dioxane and any residual excess hydrogen cyanide is then removed from this residue by distillation under reduced pressure. There is thus obtained 38 parts of a polycyanohydrin as a brown oil analyzing for 77.40% carbon, 11.56% hydrogen, 0.90% nitrogen and an hydroxyl number of 17.5. The nitrogen content corresponds to a conversion of 10% of the carbonyl groups of the parent polyketone to cyanohydrin groups.

Example III

A reactor equipped for operations under pressure is charged with 50 parts of liquid hydrogen cyanide, 5 parts of pyridine, and 50 parts of an ethylene/carbon monoxide polymer containing ethylene and carbon monoxide in a molar ratio of 9.26:1 and having a molecular weight of 1442. The reactor is sealed, placed in a shaker machine, and heated until an internal temperature of 100° C. is reached. Heating is continued at this temperature with agitation for four hours under autogenous pressure. The reactor is then cooled to room temperature, opened, and excess hydrogen cyanide is bled to the atmosphere. The residue remaining in the reactor is taken up in benzene, and the benzene and any residual hydrogen cyanide are removed by distillation. There is thus obtained 30 parts of a polycyanohydrin as a brown, wax-like solid analyzing for 82.47% carbon, 13.37% hydrogen, 1.59% nitrogen and an hydroxyl number of 165. The nitrogen content corresponds to a conversion of 36% of the carbonyl groups of the parent polyketone to cyanohydrin groups.

Example IV

A glass reactor fitted with suitable means for agitation of the contents, a reflux condenser and entry and exit ports, is charged with 54 parts of liquid hydrogen cyanide and 35 parts of an ethylene/carbon monoxide polymer containing ethylene and carbon monoxide in a molar ratio of 2.42:1 and having a molecular weight of 1738. This mixture is stirred at 27° C. for three hours or until the polyketone dissolves. To the cloudy, straw-colored solution thus obtained is added 0.5 part of potassium cyanide. The mixture is stirred for an additional three hours at room temperature. There is then added 1.1 parts of 85% phosphoric acid to destroy the potassium cyanide catalyst, and the excess hydrogen cyanide is subsequently removed by distillation. The remaining residue is dissolved in a mixture of 175 parts of benzene and 79 parts of ethyl alcohol. The solvent mixture and any residual hydrogen cyanide are then removed by distillation under reduced pressure. There is thus obtained 27 parts of a polycyanohydrin as a viscous, clear, straw-colored resin analyzing for 66.99% carbon, 9.24% hydrogen, 9.14% nitrogen, a carbonyl number of 149, and an hydroxyl number of 224. The nitrogen content corresponds to a conversion of 80% of the carbonyl groups in the parent polyketone to cyanohydrin groups.

Although in the examples there are indicated certain definite conditions of temperature, concentration, duration of reaction, etc., it is to be understood that these may be varied somewhat within the scope of this invention since the conditions of each experiment are determined by the particular monoolefin/carbon monoxide copolymer treated, the basicity of the catalyst employed, the nature of the medium, and the degree of conversion of carbonyl groups to cyanohydrin groups desired. In general, the process is operable at temperatures ranging from —78° C. to +200° C. and at pressures from atmospheric to a maximum determined by the mechanical limitations of the equipment employed and the nature of the specific reactants involved. It is preferred to operate at a temperature from —14° C. to +50° C. and under a total pressure no greater than that of the autogenous pressure obtained when a closed system is employed under the chosen reaction conditions.

The amount of hydrogen cyanide employed in the hydrocyanation of the monoolefin/carbon monoxide copolymers is at least one mole of hydrogen cyanide per carbonyl group in the polymer for complete conversion of the carbonyl groups to cyanohydrin groups. In actual practice much larger amounts are employed, for example, from 5 to 500 moles per carbonyl group. If it is desired not to convert all the carbonyl groups in the polymer to cyanohydrin groups, the quantity of hydrogen cyanide needed is that fraction in moles of hydrogen cyanide corresponding to that proportion of all carbonyl groups in the polymer which it is desired to convert to cyanohydrin groups. For example, if it is desired to convert 25% of the carbonyl groups in a monoolefin/carbon monoxide copolymer to cyanohydrin groups, the minimum quantity of hydrogen cyanide needed would be one quarter of a mole of hydrogen cyanide for each carbonyl group in the polymer.

The proportions of reactants necessary to prepare the novel products of this invention will vary considerably with the particular polyketone. For instance, 10,000 parts of a polyketone of molecular weight 10,000 containing a four-carbon olefin and carbon monoxide in the mole ratio 150:1 requires a minimum of 32 parts of hydrogen cyanide for conversion of all the carbonyl groups to cyanohydrin groups. On the other hand the same quantity of a polyketone of molecular weight 250 containing a two-carbon olefin and carbon monoxide in the mole ratio 1:1 requires a minimum of 4821.6 parts of hydrogen cyanide for conversion of all the carbonyl groups to cyanohydrin groups.

In order that the polycyanohydrins described herein may differ sufficiently from the initial polyketones to possess the desired properties, at least 4% of the carbonyl groups of the polyketones should be converted to cyanohydrin groups. Thus, 10,000 parts of a polyketone of molecular weight 10,000 containing a four-carbon olefin and carbon monoxide in the mole ratio 150:1 requires 1.28 parts of hydrogen cyanide for conversion of 4% of the carbonyl groups to cyanohydrin groups and the same quantity of a polyketone of molecular weight 250 containing a two-carbon olefin and carbon monoxide in the mole ratio of 1:1 requires 192.86 parts of hydrogen cyanide for conversion of 4% of the carbonyl groups to cyanohydrin groups.

The amount of hydrogen cyanide used, the degree of conversion of carbonyl groups to cyanohydrin groups desired, and the temperature are all interdependent variables and variation in one necessitates compensating adjustments in the other.

If desired to facilitate contact of the monoolefin/carbon monoxide polymers with the hydrogen cyanide or to facilitate purification, organic solvents can be utilized as reaction media. For example, there may be used hydrocarbons such as benzene, xylene, decahydronaphthalene, etc.; ethers, e. g., diethyl ether, dioxane, etc.; alcohols, e. g., isopropyl alcohol, butyl alcohol, etc. In general, any organic solvent can be used that is non-reactive with the monoolefin/carbon monoxide polymers and with the hydrogen cyanide. For ease of subsequent removal, solvents of low boiling point are preferred.

Suitable basic catalysts are alkali and alkaline earth metal oxides, hydroxides and salts, such as the cyanides, carbonates and acetates. Examples of these catalysts are calcium oxide, magnesium hydroxide, sodium carbonate, potassium acetate, sodium oxide, potassium hydroxide, calcium carbonate, magnesium acetate and calcium cyanide. Other basic compounds that can be used are gaseous or aqueous ammonia; organic bases, such as pyridine, piperidine, the dipiperidyls, quinoline, primary, secondary or tertiary amines. These basic materials are used in amounts of 0.001 to 10.0% based on the hydrogen cyanide. Amounts of 0.1 to 1.0% are preferred.

The monoolefin/carbon monoxide polymers which are the polyketones used in preparing the present polycyanohydrins are obtained by polymerizing with carbon monoxide a monoolefin containing from 2 to 4 carbon atoms or mixtures thereof in contact with a peroxy catalyst or other polymerization catalyst. These polymers are disclosed and claimed in application Serial Number 552,374, filed September 1, 1944, by M. M. Brubaker, now abandoned, of which Serial No. 97,908, filed June 8, 1949, is a continuation-in-part. As there disclosed, these polymers are obtained by reacting the monoolefin with carbon monoxide in contact with a peroxy catalyst and in the absence of a Friedel-Crafts catalyst at temperatures of from 25° C. to 350° C. under any pressure above atmospheric. Particularly favorable reaction conditions include temperatures of about 50° C. to 150° C. and pressures of 20 to 1500 atmospheres. The monoolefin/carbon monoxide polymer used in Example III was made by the following procedures:

A steel pressure vessel is charged with 80 parts of cyclohexane and 2.38 parts di(tertiary butyl)peroxide. The vessel is closed, evacuated, placed in a shaker machine and connected to a reservoir containing a gas mixture of 75% ethylene and 25% carbon monoxide under high pressure. Agitation is started and the temperature is brought to 135° C. Concurrently the pressure is adjusted to 2000 lb./sq. in by bleeding the ethylene/carbon monoxide mixed gas from the reservoir. The reactants are then maintained at a temperature of 135–140° C. and under a pressure of 1850–2000 lb./sq. in. for 15 hours by intermittent addition of the mixed gas. The reactor is allowed to cool, opened, and the contents discharged. The product comprising polyketone and cyclohexane is subjected to distillation to remove the cyclohexane. There is thus obtained 79 parts of an ethylene/carbon monoxide polyketone as a light brown, soft wax. This polyketone has a molecular weight of 1738 and analyzes for 72.86% carbon, 10.41% hydrogen, and 16.73% oxygen, which corresponds to a product containing 29.28% combined carbon monoxide, and 70.72% combined ethylene. These data indicate an ethylene/carbon monoxide mole ratio of 2.42:1.

The ethylene/carbon monoxide polymers mentioned in the examples can be replaced by any of the polyketones obtained by reacting carbon monoxide with an olefin of 2 to 4 carbon atoms, e. g., ethylene, propylene, 1-butene, 2-butene, or with a mixture of these olefins. The atoms attached to the chain carbons other than the ketone carbon will be hydrogen, methyl, and/or ethyl groups depending upon the monoolefin or monoolefins used. These polymers, which should consist of above 50% by weight of the polymerization product of carbon monoxide and the monoolefin, can, if desired, be modified by including with the reaction mixture of carbon monoxide and monoolefin a minor amount of other known polymerizable monomers, for example, the vinylidene compounds such as vinyl chloride, vinyl acetate, styrene; methyl methacrylate, methyl acrylate, vinylidene chloride; vinylene compounds, e. g., dimethyl maleate, maleic anhydride, etc.

The properties of the monoolefin/carbon monoxide polymers from which the polycyanohydrins of this invention are prepared can be quite markedly changed by varying either the monoolefin/carbon monoxide mole ratio in the polymer or the molecular weight or both. The monoolefin/carbon monoxide polymers that can be utilized in preparing the polycyanohydrins may possess a monoolefin/carbon monoxide mole ratio of from 1:1 to 150:1 and may have a molecular weight of from 250 to 10,000. For the present purpose it is most advantageous to prepare the polycyanohydrins from monoolefin/carbon monoxide copolymers of a 1.5:1.0 to a 10.0:1.0 monoolefin/carbon monoxide mole ratio and a molecular weight of from 250 to 3,000.

By varying the molecular weight and/or the monoolefin/carbon monoxide mole ratio of the monoolefin/carbon monoxide polymers used to prepare the polycyanohydrins, there is obtained a large family of polycyanohydrins. Furthermore, since it is possible through variations in the reaction conditions to react from one to essentially all the carbonyl groups in the monoolefin/carbon monoxide polymer being used, this family of polycyanohydrins can vary not only in molecular weight and monoolefin/carbon monoxide mole ratio but also in the cyanohydrin ratio, i. e., the proportion of carbonyl groups in the polymer converted to cyanohydrin groups.

The polycyanohydrins are resins useful in preparing coating compositions, for example, for metals. They may also be used in preparing the corresponding polyhydantoins.

As many apparently widely different embodiments of this invention may be made without departing from the spirit and scope thereof, it is to be understood that I do not limit myself to the specific embodiments thereof except as defined in the appended claims.

I claim:
1. A process for making polymeric materials which comprises contacting in basic medium reactants consisting of a polyketone and hydrogen cyanide, said polyketone being a polymer which has a molecular weight of from 250 to 10,000 and which comprises the reaction product of carbon monoxide and a monoolefin having from two to four carbons, and in which the mole ratio of combined monoolefin to carbon monoxide is from 1:1 to 150:1.

2. The process set forth in claim 1 in which said polyketone has a molecular weight of from 250 to 3000 and in which the mole ratio of combined monoolefin to carbon monoxide is from 1.5:1 to 10:1.

3. The process set forth in claim 1 in which said polyketone comprises the reaction product of carbon monoxide and ethylene.

4. The process set forth in claim 1 in which said basic reaction medium contains an alkali metal cyanide.

5. The process set forth in claim 1 in which said basic reaction medium contains an alkaline earth metal cyanide.

6. The process set forth in claim 1 in which said basic reaction medium contains pyridine.

7. The process set forth in claim 1 in which said polyketone has a molecular weight of from 250 to 3000.

8. The process set forth in claim 1 in which the mole ratio of combined monoolefin to carbon monoxide is from 1.5:1 to 10:1.

9. A polycyanohydrin which is the reaction product in basic medium of reactants consisting of hydrogen cyanide and a monoolefin/carbon monoxide polymer, and in which at least 4% of the carbonyl groups in said polyketone are converted to cyanohydrin groups, said polyketone having a molecular weight of from 250 to 10,000 and being the polymerization product of a 2 to 4 carbon atom monoolefin with carbon monoxide in a mole ratio of said monoolefin to carbon monoxide of from 1 to 150:1.

10. The polycyanohydrin as defined in claim 9 in which the mole ratio of monoolefin to carbon monoxide in said polymer is from 1.5:1 to 10:1.

11. The polycyanohydrin as defined in claim 9 in which said monoolefin/carbon monoxide polymer has a molecular weight of from 250 to 3000.

12. The polycyanohydrin as defined in claim 11 in which said mole ratio of monoolefin to carbon monoxide in said polymer is from 1.5 to 10:1.

PAUL S. PINKNEY.

REFERENCES CITED

The following references are of record in the file of this patent:

UNITED STATES PATENTS

| Number | Name | Date |
|---|---|---|
| 2,457,279 | Scott | Dec. 28, 1948 |

OTHER REFERENCES

Beilsteins Hand. der Org. Chem., 4th ed., vol. 3, 1921, page 536.